United States Patent [19]

Natale et al.

[11] 4,379,682

[45] Apr. 12, 1983

[54] REACTION APPARATUS FOR THE FORMATION OF MICROSPHERES OR MICROCAPSULES

[75] Inventors: Peter J. Natale, Canton; Igino Lombardo, Sharon, both of Mass.

[73] Assignee: Ortho Diagnostics, Inc., Raritan, N.J.

[21] Appl. No.: 258,715

[22] Filed: Apr. 29, 1981

[51] Int. Cl.³ .............................................. B29C 23/00
[52] U.S. Cl. ......................................... 425/10; 264/9; 264/14; 264/40.6; 425/6; 425/143
[58] Field of Search ................. 425/10, 6, 143; 264/9, 264/14, 40.6

[56] References Cited

U.S. PATENT DOCUMENTS

| | | | |
|---|---|---|---|
| 2,619,496 | 11/1952 | Stanton | 425/6 X |
| 3,344,617 | 10/1967 | Rinfret et al. | 264/14 X |
| 4,162,282 | 7/1979 | Fulwyler et al. | 264/9 |
| 4,251,195 | 2/1981 | Suzuki et al. | 425/6 |

OTHER PUBLICATIONS

Fulwyler, M. J.; J. D. Perrings and L. S. Cram, "Production of Uniform Microspheres" in *The Review of Scientific Instruments* vol. 44, No. 2, Feb. 1973, pp. 204–206.

*Primary Examiner*—Philip E. Anderson
*Attorney, Agent, or Firm*—Mark A. Hofer

[57] ABSTRACT

A core/sheath vibrating system is utilized to produce core droplets within the sheath, which in turn form into microparticles through phase separation. The flow momentum is first arrested by means of an inclined surface, and the combination is thence deposited, in a continuous, helical channel extending from one end to the other of the inside of a hollow, rotating drum. Rotation of the drum moves the forming microspheres through the channel. At the exit end of the drum, the sheath fluid which carries suspended microspheres, may be filtered, and the microspheres collected and utilized.

5 Claims, 4 Drawing Figures

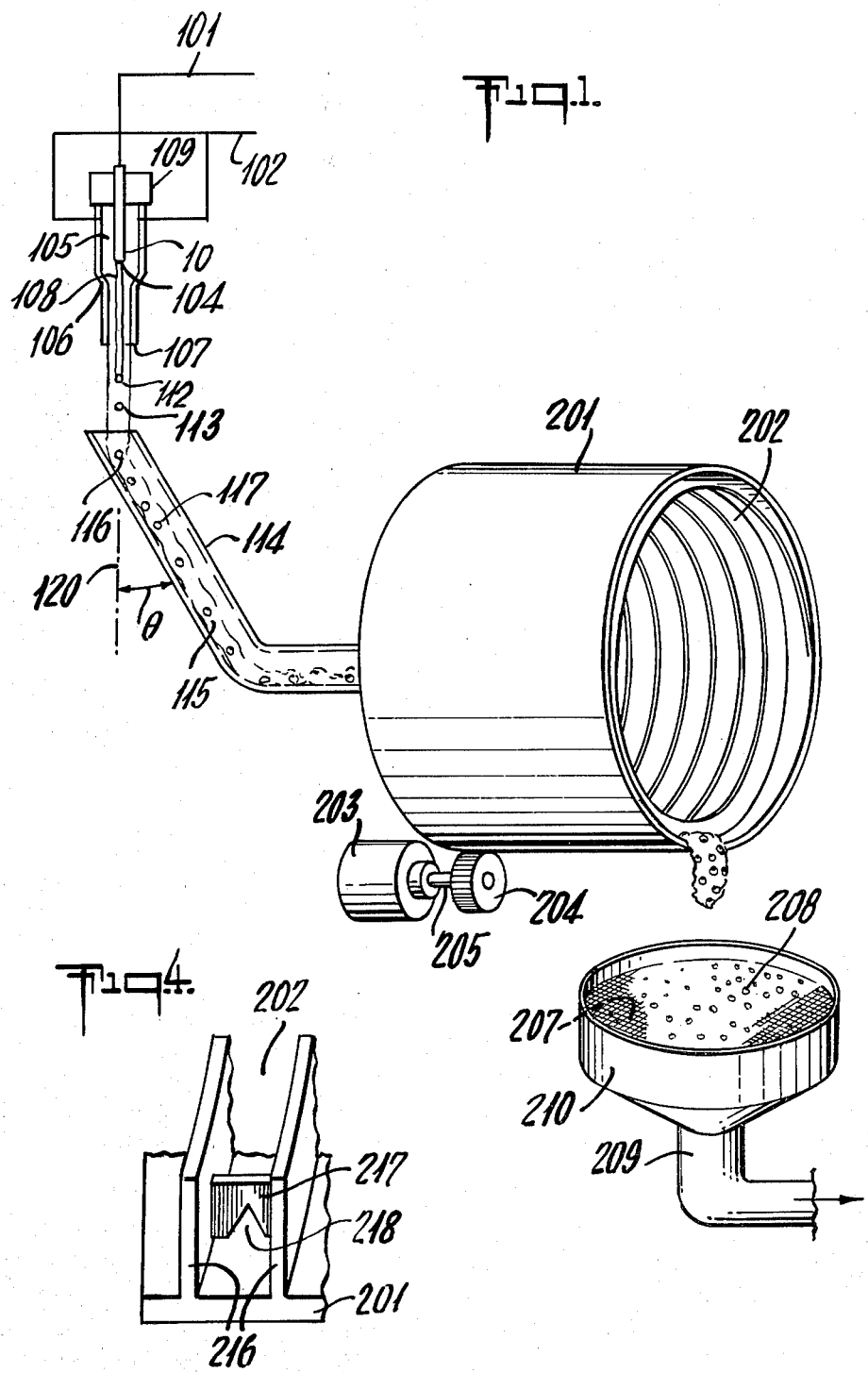

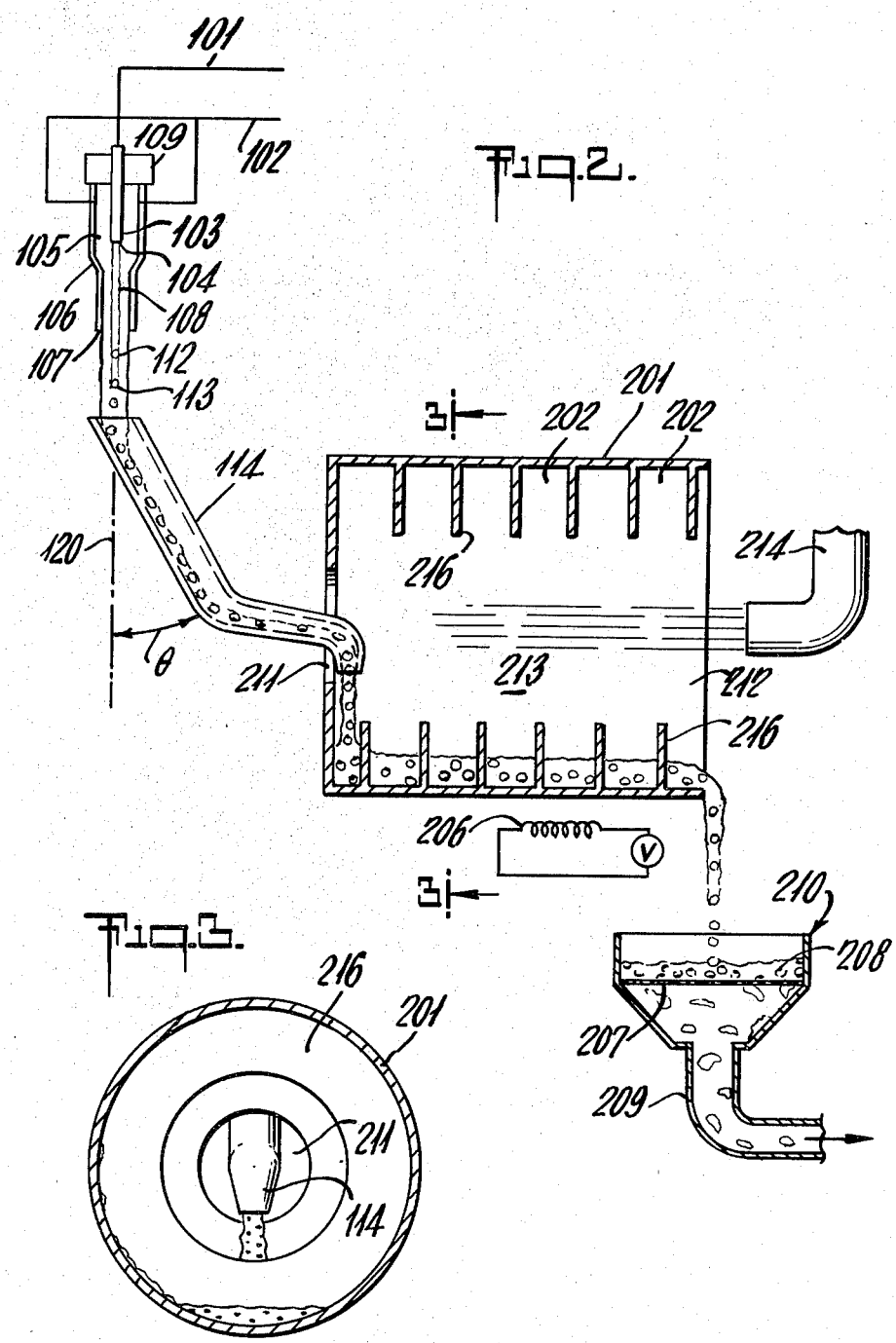

REACTION APPARATUS FOR THE FORMATION OF MICROSPHERES OR MICROCAPSULES

FIELD OF THE INVENTION

This invention relates to the formation of microparticles, and more particularly to apparatus and methods for promoting formation of such microparticles from droplets utilizing the phase separation method.

BACKGROUND OF THE INVENTION AND PRIOR ART

In accordance with the phase separation method of particle production, for example for production of latex particles, the latex material is disposed in a solvent, which in turn is suspended in droplets in a fluid bath. The solvent and bath materials are chosen such that the solvent is slightly soluble in the fluid path, but the latex is essentially insoluble in the bath. Thus, as solvent diffuses into the fluid bath material, the latex is continuously redistributed and concentrated. When all of the solvent has diffused out of the latex droplets, a solid latex particle remains, the size of which depends on the amount of latex material in the original droplet.

The prior art teaches numerous methods whereby droplets of solvent used in the phase separation process are sized and processed such that particles of corresponding size and precision will be produced.

The prior art teaches at least one method which purports to produce monodispersed particles in the range of two to five micrometers in diameter, and larger, at a precision of at least 2% by volume. This method is described by M. J. Fulwyler et al. in an article entitled "PRODUCTION OF UNIFORM MICROSPHERES", Review of Scientific Instruments, 44, 1973. Similar techniques are set forth in U.S. Pat. No. 4,162,282 to Fulwyler et al. entitled "METHOD FOR PRODUCING UNIFORM PARTICLES", issued July 24, 1979 from an application filed Apr. 22, 1976. In accordance with the Fulwyler et al. techniques, a core liquid is injected into a moving sheath liquid. When combined, sheath and core are together formed into biphasic droplets as the fluids are jetted from a vibrating nozzle. The droplets are collected, and by stirring are held suspended in a catch liquid until the core and sheath liquids from each droplet have diffused into the catch liquid, leaving particles formed of the materials which were dispersed within the core.

It has been found that, in accordance with the Fulwyler et al. methods, the technique by which the fast moving droplets are collected and stirred is an important and indeed critical mechanism for the formation of uniform particles. The fast flowing sheath of fluid forms biphasic droplets which have considerable kinetic energy and momentum; depending on droplet size and velocity, there exists a varying degree of risk, nearly always substantial, that the droplets will experience shear forces of such intensity that they are broken apart during the collection process.

In a concurrently filed, copending application, assigned to the assignee hareof and entitled "APPARATUS AND METHOD FOR PROMOTING THE FORMATION OF MICROPARTICLES", we describe and claim a system for utilization of the core/sheath approach to the generation of microparticles, as taught by Fulwyler, but at faster rates, employing substantially reduced sheath and catch liquid volumes, eliminating the need for droplet charging, and employing respective nozzle sizes which obviate the danger of frequent clogging. In accordance with that copending, concurrently filed disclosure, the velocity and momentum of the droplets and surrounding sheath liquid are mechanically but safely taken up during the onset of the phase separation process, but prior to the ultimate collection of the forming and partially formed particles. More specifically, the momentum of the sheath stream and core fluid droplets is transferred to a surrounding medium in the presence of shear forces low enough to cause breakage of droplets. In one embodiment, the microdroplet jet containing the sheath fluid is directed onto and down a hydrophobic surface inclined at a very low angle (e.g. one to ten degrees) relative to the inclination to the jet. Kinetic energy of the sheath stream and core droplets is lowered by transfer of momentum to the hydrophobic surface, and, to a lesser extent, by frictional loss between the droplet flow and the surface.

That copending, concurrently filed application provides for collection of the "setting" but not completely formed microparticles as runoff from the surface, into an unspecified collection vessel. Conventionally, the collection, final formation, and separation process is conducted in a batch processing mode. The above captioned Fulwyler patent for example, provides for the spheres and sheath liquid to be dumped into a catch liquid basin, with the catch liquid being stirred or agitated until the core liquid of the uniform spheres has dissolved into the catch liquid, leaving spherical solid particles to be removed and concentrated by settling, filtering, centrifuging, or otherwise.

It is a primary object of the present invention to provide improved apparatus for collecting and promoting the formation of microspheres or microcapsules. Allied objects include provision for continuous, rather than batch mode processing, and for providing a high degree of control over all important aspects of the process.

SUMMARY OF THE INVENTION

In accordance with the principles of the present invention, a continuous reaction vessel is formed by a hollow drum which defines on its inner surface a continuous helical channel or groove from an inlet end to an outlet end of the drum. As the drum is rotated, the forming droplets, bathed in carrier solution, are advanced along the channel or groove by drum rotation, while ambient conditions are well controlled. By the time the material is ejected from the outlet end of the drum, the sheath fluid carries suspended, formed microspheres which then may be separated in simple fashion. In one embodiment, the groove is continuous and unbroken from one drum end to the other, while in another embodiment periodic mixing baffles, coated with hydrophobic material, provide mild flow turbulence to maintain uniform suspension of the forming droplets in the carrier solution.

It is a feature of the present invention that the internally grooved, continuously rotating drum increases the surface to volume ratio of the reaction, thus facilitating the vaporization of volatile fluids. Correspondingly, the large open core area allows for easy reduction of vapor pressure within the reaction vessel. Likewise, control of ambient atmospheric temperature, as well as the temperature of the drum itself, permits a very precise control of phase separation time, and correspondingly for control of the parameters of particle formation.

DESCRIPTION OF THE DRAWINGS

FIG. 1 shows a partially isometric, partially cutaway view of an illustrative embodiment of the principles of the present invention;

FIG. 2 shows a cutaway view of a system embodying the principles of the present invention;

FIG. 3 shows a transverse cutaway view of a portion of the FIG. 2 apparatus;

FIG. 4 shows an alternative detail construction relating to the principles of the present invention.

BEST MODE FOR CARRYING OUT THE INVENTION

Referring first to FIG. 1, there is shown an illustrative embodiment of the principles of the present invention, as applied to a system for forming droplets and microparticles as described in the previously mentioned copending, concurrently filed application of Natale and Lombardo. In particular, a core liquid, for example an organic solvent containing a dissolved latex material, is coupled from a supply via supply line 101 to an injection conduit 103. A sheath fluid is coupled from a supply via supply line 102 to a flow channel 106. As is known in the art, the sheath fluid 105 in flow channel 106 and the injected core fluid 108 from opening 104 are joined together under laminar flow conditions by regulation of the volume and pressure from the respective supplies 101 and 102. Hence, at nozzle 107 the sheath fluid and core droplets are uniformly, coaxially jetted into the air.

As is also known in the art, a piezoelectric transducer 109 vibrates the injection conduit 103 and thereby periodically disturbs the flow of the jetting core liquid 108 as it emerges from the opening 104, forming core droplets 112, 113, etc. The size of the droplets 112 and 113, is established as is known in the art, by the size of the opening 104, the sheath flow rate and volume, and the periodicity of vibration of the conduit 103 as established by the transducer 109.

The stream containing droplets 112, 113, etc. is jetted from the nozzle 107 onto an inclined hydrophobic surface 114, along which it flows and hence is slowed as the particle forming phase separation begins. The angle $\theta$ between surface 114 and the incidence plane 120 of the exiting stream containing the droplets is vastly exaggerated in the drawings for purposes of explanation. Generally, the preferred range for the angle $\theta$ is between three and five degrees, although for certain applications, a range from less than one degree to ten degrees or greater may be employed.

The flow of droplets such as 116 and 117 is also vastly exaggerated in the drawings, with the fluid jacket 115 symbolically representing a virtually continuous fluid flow of constituent droplets along the surface 114. As the droplet containing the jet from nozzle 107 impacts upon surface 114 and then flows downwardly along surface 114, the momentum of the droplets such as 116 is transferred to the surface 114. As the droplets in the sheath fluid flow along the surface 114, they are slowed by virtue of friction forces engendered by the hydrophobic surface 114. During such time, the phase separation is occurring, and much of the particle "setting" has occurred by the time the droplets run from the surface 114. In in accordance with disclosure in the cited concurrently filed, copending application, the surface 114 preferably is composed of a polymeric material such as F.E.P. (fluoroethylene-propylene), or the material available under the trade name Teflon (tetra-fluoro-ethylene).

In accordance with the principles of the present invention, the flow of sheath liquid, with the forming droplets/particles, is deposited into a groove 202 at one end of a horizontal drumlike rotating spiral collector 201. The drum 201 is turned by suitable means, for example a friction wheel 204 which is shaft driven from a motor 203. Alternatively, gear, belt, or equivalent arrangements can be utilized to rotate the drum 201.

The forming microparticles are advanced through the continuous helical groove 202 by means of the rotation of the drum 201, such that the exiting fluid, which carries the fully formed microparticles, is deposited from the groove 202 into a filter assembly 210, which utilizes a filter screen 207 to separate the filtered microspheres 208 from the carrier fluid. The carrier fluid is carried to a waste receptacle or disposal by means of a conduit 209.

The principles of the present invention may perhaps be better understood upon consideration of FIGS. 2 and 3 which include respective sectional views of an embodiment of the drum collector 201. In FIGS. 2 and 3, the channel or groove 202 is formed by a continuous helical wall 216 which, due to the curved inner surface of the horizontal drum 201 and the rotation thereof, forms separate discrete pools of sheath fluid and suspended droplets, which pools are advanced from an inlet end 211 of the drum 201 to an outlet end 212. As these pools of sheath fluid and suspended droplets are advanced from the inlet 211 to the outlet 212, the phase separation process is conducted and completed, such that substantially fully formed suspended microparticles are contained in the fluid which is dumped into the collection/filter apparatus 210. As is symbolically shown in FIG. 2, the carrier fluid passes through the filter screen 207 and is carried away by means of conduit 209. The microspheres 208 remain above the filter screen 207, to be gathered in convenient fashion. It will thus be noted that the production of microspheres is substantially continuous, in the sense that the flow from surface 114 into the drum 201 occurs on a continuous basis, with successive pools of sheath fluid and suspended microspheres being deposited in the collection filter apparatus 210 and thence produced at outlet end 212 on an incrementally continuous basis.

It will be noted from FIG. 2 that the drum 201 defines a substantial interior space 213 into which organic vapors gather as a consequence of the phase separation process in the respective pools defined by the groove walls 216. This space structure permits utilization of an air system, shown symbolically at 214, either for suction of vapors from the drum 213, or for convection of temperature controlled air through the drum from 214, or both, in order to control the temperature of the reaction vessel and to expel the vapors therefrom (e.g. out through the inlet port 211).

Also shown symbolically in FIG. 2 is a heating circuit 206, whereby the temperature of the drum 201 itself may be controlled. Hence, joint air temperature control and reaction vessel temperature control will permit an extremely fine vernier for the thermal condition of the phase separation reaction.

FIG. 4 shows an alternative feature which may be utilized in accordance with the principles of the present invention, to wit, providing periodic baffles 217 within the groove 202, whereby mild turbulence is established to keep the droplets/particles in relatively uniform suspension as they are forming. As shown in FIG. 4, a preferred form of baffle constitutes a partial block 217 which allows the fluids to pass over the top thereof (but still within the channel 202), and also through a cutout 218 therebeneath.

In a preferred embodiment, the grooves 202 within the drum are coated with a hydrophobic material, for example the same material which forms the surface 114 (e.g. fluoroethylene-propylene, or tetra-fluoro-ethylene). The drum 201 itself is of a thermally conductive metal, such as aluminum. In such preferred embodiment, the drum is approximately 9 inches in axial length and 8 inches in diameter, with the groove 202 having 16 full peripheral cycles to form the inlet-to-outlet helix. Each such groove is thus approximately 7/16 inches wide, and 1½ inches in depth. Should baffles such as shown in FIG. 4 be employed, the channel or groove 202 will employ approximately two baffles per rotation cycle of the continuous groove 202, with the notch openings 218 being approximately ¼ inch in height and width. Clearly, however, all of these parameters will be freely variable in accordance with the abilities of those of ordinary skill in the art as well as the rotational speed of the drum, depending upon the precise character of the reaction, and constituency of the reactants. Similarly, the selection and variation of air flow rates and air and drum thermal conditions will be variable in accordance with the abilities of those of ordinary skill in the art, depending upon the nature of the reaction employed.

The principles of the present invention may also be used for manufacture of microspheres by interfacial polymerization. In such a situation, a biphasic suspension is introduced as shown in the drawings at the inlet end 211 of the drum 201, with the suspended droplets containing one of the chemical reactants for polymer formation. At the same time, additional suspension fluid containing additional chemical reactants for polymer formation, is similarly introduced into the groove 202 at the inlet end 211 (e.g. by means of a nozzle, not shown, of configuration similar to tubing 114 as shown). Thus, the rotation of the drum mixes the two fluids, initiating the reaction for polymeric formation at the surface of the suspended droplets. Polymer formation continues at the interface of the droplets while the segmented aliquot is in residence through the drum. Termination of the reaction occurs when the segmented fluid reaches the outlet 212 of the rotating drum 201, and spills into the collection apparatus 210, which in this case also includes a reaction quenching bath. Thus, depending upon the temperature and rotation and speed of the drum, reaction conditions are adjustable for continuous production of microspheres by interfacial polymerization.

The foregoing has set forth preferred and illustrative embodiments of the principles of the present invention, but it is to be understood that numerous alternative embodiments will occur to those of ordinary skill in the art without departure from the spirit or scope of the principles of the principles of the present invention. For example, the essential fabrication of the drum 201 and the groove 202 will no doubt be variable, providing different materials, different cross-sectional shape of the groove, and modification of various aspects which, as discussed herein, facilitate control of the important parameters of the reaction. Likewise the apparatus may be utilized for applications wherein cells or the like biological materials are constrained within the forming and formed microparticles.

We claim:

1. Microparticle formation apparatus for use in a system of microparticle formation from a flowing stream of a core liquid ejected from the exit of a vibrating nozzle concurrently and coaxially into a flowing stream of a sheath liquid forming a composite liquid stream wherein droplets formed of said core liquid within said sheath liquid are formed into microparticles, said formation apparatus further comprising:

(a) a drum having a substantially horizontal longitudinal axis therethrough, said drum defining an inlet end and an outlet end and forming a cavity between said inlet and outlet ends, and an internal spiral channel means extending between said inlet and outlet ends;

(b) mixing means intermittently spaced within said channel means to provide turbulence in the flow of said composite liquid stream from said inlet end to said outlet end; and (c) means for rotating said drum about said longitudinal axis.

2. The apparatus of claim 1 wherein said mixing means comprises transverse baffles.

3. The apparatus of claim 1 and further comprising means for controlling the temperature of said cavity; and means for controlling the vapor pressure of said cavity.

4. The apparatus of claim 1 and further comprising means for controlling the temperature of said drum.

5. Formation apparatus for use in a system for generating microparticles by injecting a first material into a moving sheath material, and by forming droplets in said sheath material with said first material upon ejection from a vibrating nozzle, said microparticles being formed by phase separation between said first material and said sheath material, said formation apparatus comprising: a hollow cylindrical drum having a continuous helical trough therein from one end to the other; mixing means in said helical trough for providing turbulence; means for depositing said sheath and droplets into said trough at one end of said drum; means for rotating said drum; and means for collecting microparticles from said trough at said other end of said drum.

* * * * *